Patented Feb. 17, 1925.

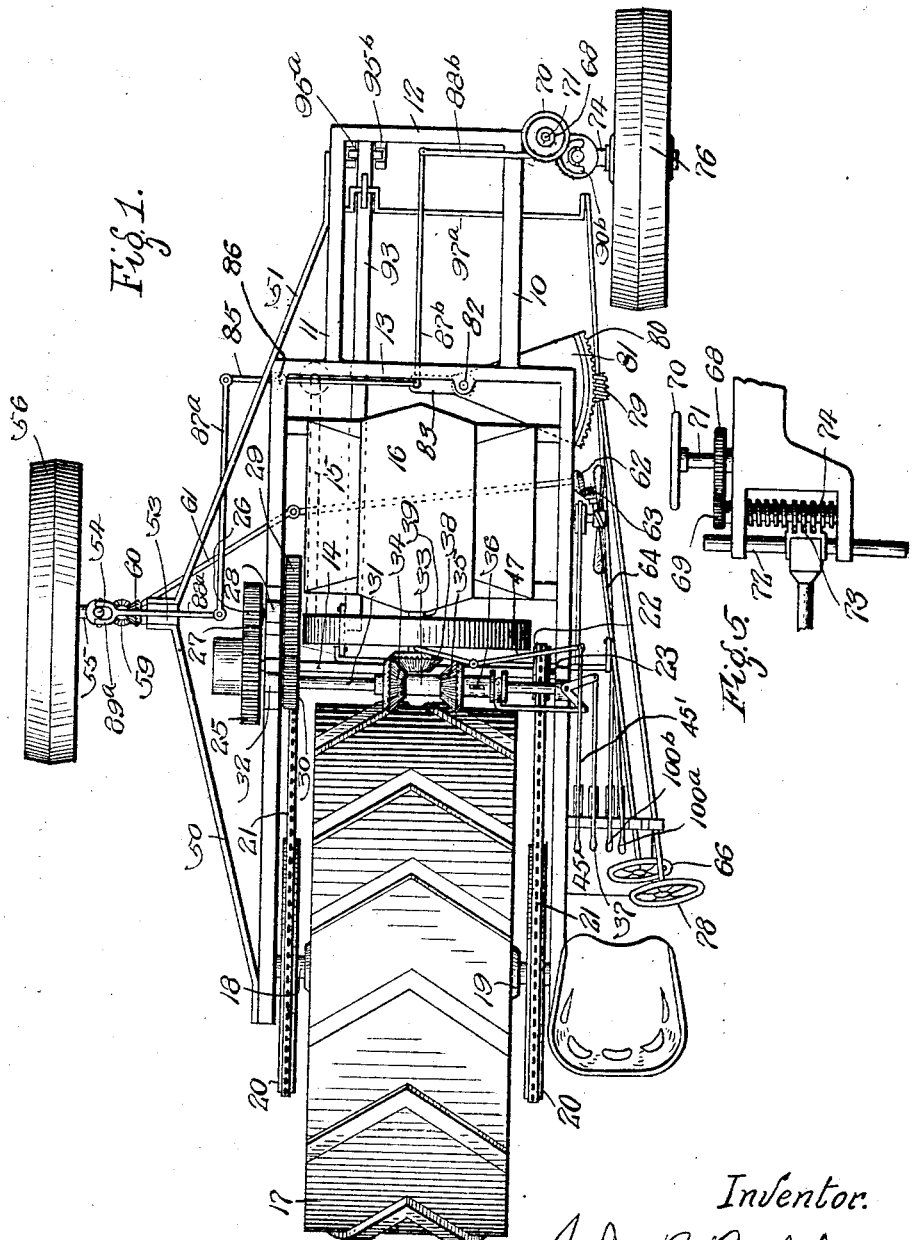

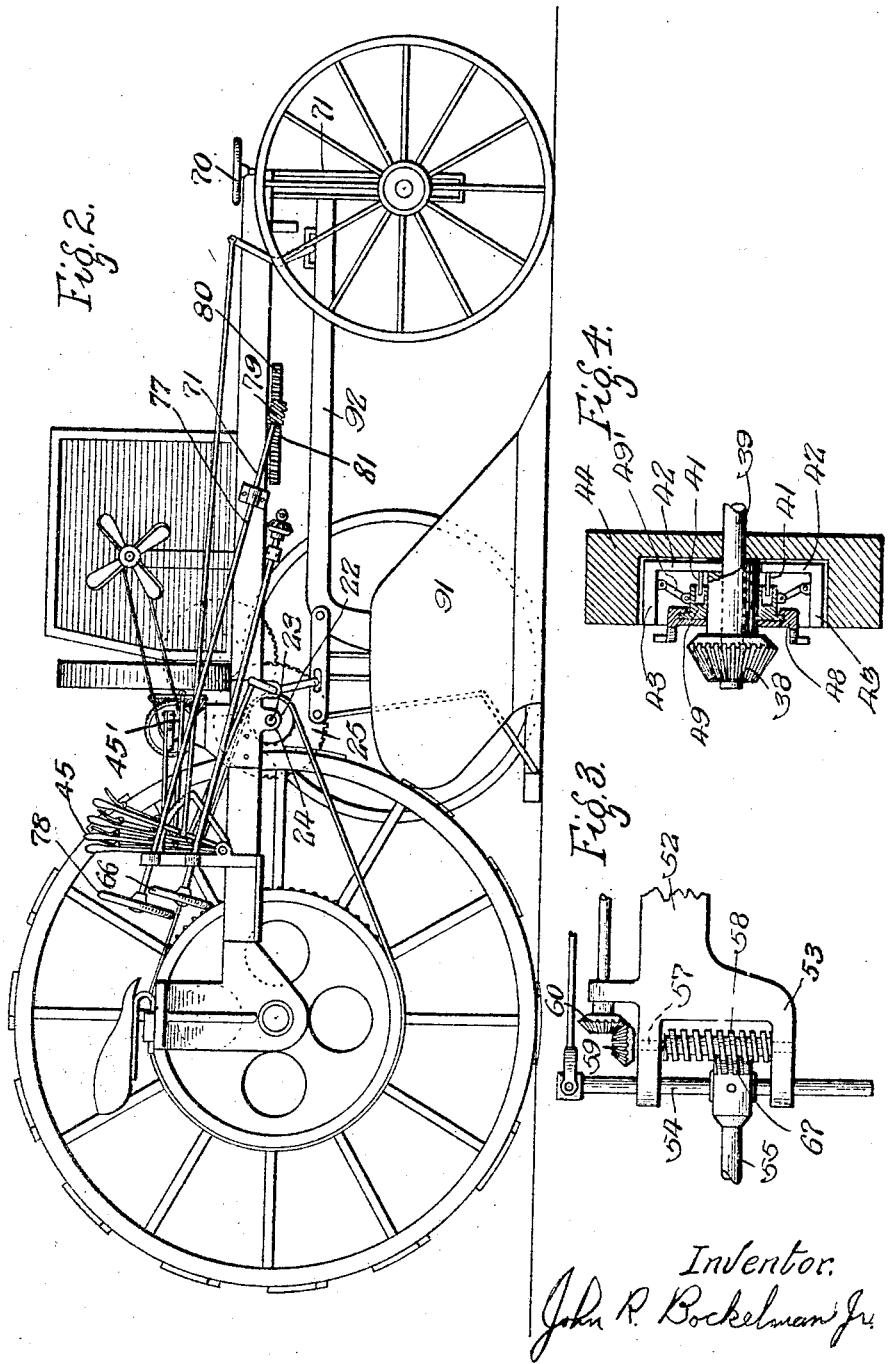

1,526,624

UNITED STATES PATENT OFFICE.

JOHN REUBIN BOCKELMAN, JR., OF SEDALIA, MISSOURI.

GEARING FOR TRACTOR PLOWS.

Application filed October 13, 1919. Serial No. 330,467.

*To all whom it may concern:*

Be it known that I, JOHN R. BOCKELMAN, Jr., a citizen of the United States, residing at Sedalia, in the county of Pettis and State of Missouri, have invented certain new and useful Improvements in Gearing for Tractor Plows, of which the following is a specification.

This invention relates to an improved plow of the tractor type and the principal object of the invention is to provide a plow having an improved frame structure and improved driving means or means for transmitting the movement to the driving wheel from the engine of the machine.

Another object of the invention is to provide a tractor plow so constructed that it may be controlled from a seat extending from the body of the frame, with further improvements to vertically adjust the frame of the machine with respect to the ground.

Another object of the invention is to provide an improved means for mounting the engine or source of power with respect to the frame and further to so construct the machine that it will be comparatively simple in construction and will not easily get out of order or need repairs.

This invention is illustrated in the accompanying drawings, wherein:

Figure 1 is a view showing the improved tractor plow in top plan.

Figure 2 is a view showing the improved plow in side elevation.

Figure 3 is an enlarged fragmentary view showing the manner of mounting the supporting wheel positioned upon the left hand side of the machine.

Figure 4 is an enlarged view of the clutch.

Figure 5 is an enlarged fragmentary view illustrating the means of mounting the front wheel in position.

This tractor is provided with a frame having side bars 10 and 11 which are connected at their forward ends by the end bar 12. Cross bars 13 and 14 connect the side bars at points intermediate the length of the frame and serve as bracing means. They are in turn connected by the longitudinally extending bar 15 which together with the side bar 10 hold the engine or source of power 16. A propelling wheel 17 is positioned in the rear portion of the frame and provided with an axle 18 journaled in the bearings 19. Two sprocket wheels 20 are carried by this driving wheel 17. Driving chains 21 lead from these sprocket wheels 20 to the sprocket wheels 22 of shaft 23 journaled in the bearings 24. At one end of the shaft 23 there is provided a large gear 25 meshing with the small gear 26 of shaft 27 journaled in the bearings 28. This shaft 27 also carries a large gear 29 which meshes with the small gear 30 of shaft 31 journaled in the bearings 32.

Upon the shaft 31 there is provided the reversing clutch 33 containing the gears 34 and 35. This reversing clutch is made in the form of a tubular section slidably mounted on the shaft 31 and interlocking with shaft 31 by means of the key 36. Positioned between the gears 34 and 35 and meshing with one of them at all times is the gear 38 encompassing the end of the engine shaft 39 of the engine or source of power 16. The gear 38 is loosely mounted on the shaft 39, but is caused to rotate with the shaft 39 at times by means of the fingers 41.

These fingers 41 are slidably mounted in the sleeve of the gear 38 and have extending radially therefrom arms 42 each carrying at its outer end a clutch element 43. As seen in Figure 4, these clutch elements are arranged within the clutch band 44 which is keyed to the shaft. A clutch member 49 is slidably mounted upon the sleeve of the gear 38 and a plurality of links 49' are pivotally connected at corresponding ends thereto and their opposite ends to the clutch element. A cooperating clutch member 48 is associated with the clutch member 49 whereby the latter may freely rotate independently of the clutch member 48. This clutch member 48 is reciprocated upon the gear sleeve by means of a hand lever 45, a draw rod 45' and a bell crank 47. The bell crank 47 is pivoted at its angle and has its inner end connected to the clutch member 48 and its opposite end to the draw rod 45'.

When it is desired to cause the gear 38 to rotate, the hand lever 45 is pulled back thereby causing the clutch members 48 and 49 to move inwardly of the clutch band 44 through the instrumentality of the draw rod 45' and bell crank 47. It is of course understood that the clutch band is keyed to the shaft 38 and that the inner ends of the arms 42 are movably associated with the gear sleeve, so as to be capable of radial movement relative thereto. As the clutch members move inwardly into the clutch band, the links 49' cause the clutch elements 43 to move outwardly and bind against the clutch band 44 thereby causing the gear 38 and its sleeve to rotate with the shaft through the instrumentality of the arms 42, clutch elements 43 and clutch band 44. Outward movement of the clutch members 48 and 49 will obviously release the grip of the clutch elements upon the clutch band, thereby permitting the idleness of the gear 38.

Either the gear 34 or the gear 35 may be made to mesh with the gear 38 by operation of the shifting lever 37 and thereby the machine is caused to be driven forward or rearward according to the direction desired to travel.

Two arms or brackets 50 and 51 extend from the side bar 11 and carry at their adjacent ends means for mounting the stub axle 55 which includes the bearing head 53 which slidably mounts the stem or pin 54 which in turn supports the spindle or stub axle 55 of wheel 56 as is shown in Figure 3. The bearing head 53 also carries the shaft 57 on which is the worm 58 and the gear 59 which meshes with the gear 60 of shaft 61. At the opposite end of the shaft 61 the gear 62 meshes with the gear 63 of shaft 64 journaled in the bearings 65$^a$ and 65$^b$ and carrying at its end the hand wheel 66. Thus by operating the hand wheel 66 the gears 62 and 63 rotate which causes the shaft 61 to rotate which in turn causes the shaft 57 to rotate through the medium of gears 59 and 60, hence the worm 58 which meshes with the teeth 67 of stub shaft 55 vertically adjusts the stem 54. In the same manner the hand wheel 70 mounted upon shaft 71 actuates the gear 68 meshing with the gear 69 of shaft 74 which carries a worm as shown in Figure 5. This worm meshes with the teeth of stub shaft; also as shown in Figure 5 it vertically adjusts the pin 72 of stub shaft of wheel 76.

This machine is provided with steering shaft 77 on which is mounted the hand wheel 78 and the worm 79 which engages the rack teeth 80 of the lever plate 81 journaled upon the pin 82 and terminating in the oblong bearing head 83 engaging one end of the lever 85 journaled upon pin 86. Links 87$^a$ and 87$^b$ extending from the lever 85 connect with the links 88$^a$ and 88$^b$ terminating in the bearing heads 89$^a$ and 89$^b$ which support the pins 90$^a$ and 90$^b$ of spindles 54 and 72 carrying the stub axles 55 and 74 of wheels 56 and 76. Hence by operation of the hand wheel 78 the wheels 56 and 76 will be simultaneously moved and therefore a turn can be easily and safely made with this machine.

When this tractor plow is in use, the engine is started and by means of the mechanism previously described, the machine may be driven across the fields. The machine will be steered in the proper path through the medium of the steering gear and thus the plow blade will be caused to cut in proper relation to a furrow previously formed or also through the proper adjustment of stem 75 a new furrow may be formed.

What I claim is:

A tractor comprising a frame, a transversely extending axle rotatably carried by the frame, a single traction wheel mounted upon the axle and disposed within the frame, relatively large drive sprocket wheels secured to the axle on each side of the traction wheel, an engine carried by said frame in advance of the traction wheel including a longitudinally extending centrally disposed drive shaft, a drive gear upon the shaft, clutch means for connecting and disconnecting the gear with the drive shaft, a transverse gear shaft arranged between the engine and traction wheel, a gear keyed to said shaft, a second shaft journaled on the frame, a large gear carried by said second shaft for meshing with aforesaid gear, said second shaft also being provided with a relatively small gear, a third shaft extending transversely of the frame, a relatively large gear carried by said last mentioned shaft for meshing with the relative small gear of the second named shaft, a pair of relatively small sprocket wheels carried by the third shaft, and sprocket chains connecting the last mentioned sprocket wheels with the first mentioned sprocket wheels and means including reversing gears slidably mounted upon the first mentioned shaft for engaging the opposite side of the drive gear wheel.

In testimony whereof I affix my signature in the presence of two witnesses.

JOHN REUBIN BOCKELMAN, Jr.

Witnesses:
 CHAS. A. SHAEFFER,
 G. M. RIDDLE.